United States Patent
Messing et al.

(10) Patent No.: US 12,092,085 B2
(45) Date of Patent: Sep. 17, 2024

(54) METHOD FOR DETECTING AN ACCRETION OF ICE ON A WIND TURBINE

(71) Applicant: Wobben Properties GmbH, Aurich (DE)

(72) Inventors: Ralf Messing, Aurich (DE); Daniel Senftleben, Aurich (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 283 days.

(21) Appl. No.: 17/438,338

(22) PCT Filed: Mar. 6, 2020

(86) PCT No.: PCT/EP2020/056026
§ 371 (c)(1),
(2) Date: Sep. 10, 2021

(87) PCT Pub. No.: WO2020/182661
PCT Pub. Date: Sep. 17, 2020

(65) Prior Publication Data
US 2022/0186714 A1    Jun. 16, 2022

(30) Foreign Application Priority Data

Mar. 11, 2019  (DE) .................... 10 2019 106 073.7

(51) Int. Cl.
*F03D 80/40*    (2016.01)
(52) U.S. Cl.
CPC ........ *F03D 80/40* (2016.05); *F05B 2270/309* (2013.01); *F05B 2270/32* (2013.01); *F05B 2270/327* (2013.01); *F05B 2270/328* (2013.01)

(58) Field of Classification Search
CPC ........ F03D 80/40; F03D 17/00; F03D 7/0224; F03D 7/0276; F03D 7/024; F03D 7/028;
(Continued)

(56) References Cited

U.S. PATENT DOCUMENTS

| | | | | |
|---|---|---|---|---|
| 7,857,586 B2 * | 12/2010 | Wobben | ................. | F03D 7/046 416/1 |
| 9,518,561 B2 * | 12/2016 | De Boer | ................. | F03D 80/40 |
| 2011/0089692 A1 * | 4/2011 | Girardin | ............... | F03D 7/0264 290/44 |
| 2012/0226485 A1 * | 9/2012 | Creagh | ................... | F03D 80/40 703/7 |

(Continued)

FOREIGN PATENT DOCUMENTS

| | | | | |
|---|---|---|---|---|
| CA | 3007337 A1 | 6/2017 | | |
| CA | 3044752 A1 * | 6/2018 | ........... | F03D 7/0224 |

(Continued)

*Primary Examiner* — Jeffrey P Aiello
(74) *Attorney, Agent, or Firm* — Seed IP Law Group LLP

(57) ABSTRACT

A method for detecting an accretion of ice on a rotor blade of a rotor of a wind turbine is provided. The can be operated at a variable rotational speed. The method includes recording a wind speed of a wind acting upon the rotor, recording an operating variable that is dependent on the wind speed and comparing the recorded operating variable or the recorded wind speed with a reference variable of a characteristic wind-speed-dependent operating-variable curve of the wind turbine. The characteristic operating-variable curve indicates an operating variable assumed to be optimal in dependence on the wind speed. The method includes detecting an accretion of ice on the rotor blade if the recorded operating variable or the recorded wind speed, deviates from the reference variable by at least a predetermined minimum deviation specified in dependence on the wind speed.

20 Claims, 4 Drawing Sheets

(58) Field of Classification Search
CPC ............... F03D 7/048; F05B 2270/309; F05B 2270/32; F05B 2270/327; F05B 2270/328; F05B 2270/335; F05B 2270/322; F05B 2270/331; F05B 2260/821; F05B 2260/80; F05B 2260/83; F05B 2240/96; F05B 2240/307; Y02E 10/72; G01M 9/065; G01M 15/12; B64D 15/20; G01L 3/24
USPC ............ 73/170.26, 112.01, 1.29, 1.28, 1.16; 244/134 R; 415/118; 416/61, 37; 701/100, 3; 702/33, 34, 60, 35, 44, 100, 702/151, 179
See application file for complete search history.

(56) References Cited

U.S. PATENT DOCUMENTS

2015/0211486 A1 7/2015 de Boer
2015/0292486 A1* 10/2015 Zhou .................. F03D 80/40
702/35

FOREIGN PATENT DOCUMENTS

| CA | 3009204 A1 | 12/2018 | | |
|---|---|---|---|---|
| CN | 104781548 A | 7/2015 | | |
| CN | 108425812 A | 8/2018 | | |
| DE | 102010015595 A1 | * 10/2011 | ............ | F03D 7/042 |
| EP | 3421784 A1 | 1/2019 | | |
| GB | 2101691 A | * 1/1983 | ............ | F03D 9/002 |
| WO | 2011/131522 A2 | 10/2011 | | |
| WO | WO 2012168089 A1 | 12/2012 | | |

* cited by examiner

METHOD FOR DETECTING AN ACCRETION OF ICE ON A WIND TURBINE

BACKGROUND

Technical Field

The present invention relates to a method for detecting an accretion of ice on a rotor blade of a rotor of a wind turbine. The present invention also relates to a wind turbine that uses such a method.

Description of the Related Art

Wind turbines, which generate electrical power from wind, are well known. For this purpose they use a rotor having at least one rotor blade, usually three rotor blades, which have an aerodynamic profile and which are driven by the wind. Depending on the installation site, weather conditions may be such that an accretion of ice can form on the rotor blade. Such an accretion of ice can alter, and usually impair, the aerodynamic behavior of the rotor blade. Depending on the installation site, such an accretion of ice may also represent a hazard of ice shedding.

Wind turbines are thus also operated in regions and locations where ice can form on the rotor blades due to the ambient conditions. Usually, such wind turbines are equipped with blade heating systems, such that the blades can be heated to counteract the unwanted formation of ice on the rotor blades. In order to trigger the heating of the rotor blades, ice detection on the rotor blades must be as reliable as possible.

One possible method for detecting an accretion of ice is a so-called power curve method. The power curve method makes use of the fact that the formation of ice on the rotor blade greatly impairs the aerodynamic properties of the rotor blade profiles. Usually, the formation of ice results in a deterioration of the lift coefficient and in an increase of the drag coefficient, both of which consequently result in a deterioration of the lift-to-drag ratio on the rotor blade profile. All of the effects mentioned together result in a reduction in the aerodynamic performance coefficient of the rotor blade, and overall in a reduced power output of the wind turbine. The accretion of ice can be detected from this.

Thus, if weather conditions occur that, from a meteorological point of view, make the formation of ice appear possible, the measured power can be used as an indicator for the formation of ice on the rotor blades. This can be done by comparing the currently recorded power curve with a reference power curve that was recorded under ambient conditions in which the formation of ice could be excluded with certainty. If, under ambient conditions that make the formation of ice appear possible, the currently recorded power curve deviates from the reference power curve by a defined threshold value, the formation of ice on the rotor blades is thus assumed and measures are initiated, such as, for example, stopping the wind turbine and starting a heating operation to thaw the ice that has accumulated on the rotor blades.

Such a method is described, for example, in U.S. Pat. No. 7,857,586.

However, both the stopping the wind turbine and the starting a heating operation represent a considerable intervention in the operation of the wind turbine and can result in considerable performance losses. Incorrect detection of an accretion of ice, in which an accretion of ice is assumed and the stated measures are initiated, when in fact there was no formation of ice, is therefore to be avoided insofar as possible. On the other hand, the stated measures should be initiated if ice formation is actually present. In any case, therefore, an increase in the response threshold at which an accretion of ice is detected would not be entirely desirable, because then some ice accretion would not be detected.

It should also be noted that criteria for an accretion of ice can vary, for example depending on the specific wind turbine or the specific installation site. This may additionally result in the said measure producing an incorrect appraisal.

The German Patent and Trade Mark Office has searched the following prior art in the priority application for the present application: U.S. Pat. No. 7,857,586 B2, EP 3 421 784 A1, WO 2011/131 522 A2.

BRIEF SUMMARY

Detecting an accretion of ice, in a reliable manner, is provided herein.

A method is proposed. Accordingly, there is taken as a basis an aerodynamic rotor of a wind turbine, which has at least one rotor blade, in particular three rotor blades. The wind turbine is one in which the rotor can be operated at a variable rotational speed. The wind turbine is therefore of the variable-speed wind turbine type.

For this purpose, it is proposed that a wind speed of a wind acting upon the rotor be recorded. For this purpose, for example a nacelle anemometer may be used, or for example a radar-based measuring system or a laser-based measuring system such as a so-called light detection and ranging (LIDAR).

An operating variable that is dependent on the wind speed, i.e., that results from the wind speed during operation of the wind turbine, is then recorded. This may be the power generated by the wind turbine, especially in partial-load operation, when the wind is still weak and nominal power cannot be generated. This is because, the greater the wind speed, the greater is the power generated by the wind turbine in partial-load operation, and it is thus an operating variable dependent on the wind speed.

In full-load operation, when the wind speed is sufficiently high, in particular when it has attained rated wind speed or is higher, the generated power of the wind turbine basically no longer depends on the wind speed, because in this case the generated power is usually regulated to rated power or another predetermined value. This is effected by adjusting the rotor blades. The stronger the wind blows, i.e., the higher the wind speed, the more the rotor blades are turned out of the wind. Accordingly, the blade angle depends on the wind speed and forms an operating variable that is dependent on the wind speed.

However, other operating variables may also be considered, such as, for example, a torque or a rotational speed.

This recorded operating variable is then compared with a reference variable of a wind-speed-dependent characteristic operating variable curve of the wind turbine. The characteristic operating variable curve is an operating variable assumed to be optimal as a function of the wind speed. Especially during the design of the wind turbine, extensive preliminary investigations are carried out and in the process, e.g., through simulations, a behavior of the respective operating variables, thus for example of the generated output power or of the rotor blade angle, can be predetermined as a function of the wind speed. Since the wind turbine is expediently designed as optimally as possible, this behavior of the operating variable as a function of the wind speed can be assumed to be the optimal behavior of the operating variable, as expected on the basis of the design. Whether this actually represents an optimal behavior is then of lesser importance—if important at all—in the case of this method. In fact, however, it is regularly the case that, during operation of the wind turbine, the operating variable actually results at the corresponding wind speed that was also predicted, or determined, by the characteristic operating variable curve. This, however, presupposes that the wind turbine can also be operated substantially without disturbances and impairments.

It is now proposed that an accretion of ice on the rotor blade be detected if the recorded operating variable deviates from the reference variable by at least a predetermined minimum deviation. Ideally, the recorded operating variable does not deviate from the reference variable, i.e., from the operating variable predicted for the wind speed. However, if a disturbance or impairment of the wind turbine occurs, a deviation may occur. The accretion of ice is a possible disturbance and, in respect of a change in the aerodynamic profile of the rotor blade, the accretion of ice is probably to be assumed as the greatest realistic change in this blade profile, i.e., in the aerodynamics of the rotor blade. Such an accretion of ice thus results in the recorded operating variable deviating from the reference variable, and therefore it is concluded from this deviation that an accretion of ice is present. This, however, necessitates the attainment of a predetermined minimum deviation. The required magnitude of such a predetermined minimum deviation may be determined in advance, in simulations. It is also possible, however, for experience to be gained in comparative installations or in comparable test installations. Frequently, however, the nature of an accretion of ice is also known quite well, and from this it is possible to determine computationally the magnitude of the deviation that is at least to be assumed. In this way, the predetermined minimum deviation can therefore also be recorded.

Alternatively, instead of comparing the recorded operating variable with a reference variable, i.e., a reference value of the operating variable, it is proposed to compare the respectively recorded wind speed with the value of the wind speed that is assigned to the recorded operating variable by the characteristic wind-speed dependent operating-variable curve. This wind speed, assigned to the recorded operating variable by the characteristic wind-speed dependent operating-variable curve, then forms the reference variable. Thus, instead of the operating variables, the assigned wind speeds are compared. Here, too, a predetermined minimum deviation is used as a basis, which is of course selected accordingly. In the comparison of the operating variables, therefore, the predetermined minimum deviation is different from a predetermined minimum deviation in the comparison of the assigned wind speeds.

It was then recognized, however, that such a deviation, be it that in the comparison of the operating variables or that in the comparison of the assigned wind speeds, can depend on the wind speed due to an accretion of ice. It is thus proposed that the minimum deviation, namely the predetermined minimum deviation, be specified in dependence on the wind speed. It has thus been recognized, firstly, that it is not sufficient to determine and take as a basis a single minimum deviation, but that wind speeds must also be differentiated when defining the minimum deviation. Such a differentiation is then made when determining the minimum deviation and the result is specified as a minimum deviation in dependence on the wind speed.

It may be the case, in particular, that the minimum deviation is specified in the form of a deviation curve in dependence on the wind speed. The minimum deviation is therefore not constant over the wind speed. In this way, in particular, a misjudgment of the accretion of ice can also be avoided, because by additionally considering the wind speed, not only is the operating variable recorded, but the deviation criterion is also defined specifically for the wind speed in question. Accordingly, the appropriate minimum deviation is also used for each case.

According to one embodiment, it is thus proposed that an output power generated by the wind turbine from the wind be recorded as an operating variable. In addition or alternatively, a blade angle set to limit the output power may be recorded as an operating variable. The two may also be combined by using the generated output power in partial-load operation and the set blade angle in full-load operation.

For the purpose of comparing the recorded operating variable with the reference variable, i.e., for evaluation, according to one embodiment the recorded output power is therefore compared with a reference power of a characteristic operating-power curve of the wind turbine. The characteristic operating-power curve indicates an output power assumed to be maximal in dependence on the wind speed. It therefore indicates the maximum output power values that can be achieved at the wind speed in question. The recorded output power is then compared with this.

According to one embodiment, the rotor rotational speed may be used as an operating variable. In particular, for this and any other embodiments relating to the consideration of the output power as an operating variable to be considered for detecting accretion of ice, it is proposed, alternatively and as appropriate, to use the rotor rotational speed, instead of the output power, as an operating variable. Moreover, in general, instead of the output power another similar output of the wind turbine may be considered, in particular a generator output.

It is thus preferably proposed that a rotor rotational speed set by the wind turbine be recorded as the operating variable and, in order to compare the recorded operating variable, or the recorded wind speed, with the reference variable, the recorded rotor rotational speed be compared with a reference rotational speed of a characteristic rotational-speed curve of the wind turbine, or the recorded wind speed be compared with a wind speed assigned to the recorded rotor rotational speed via the characteristic rotational-speed curve, wherein the characteristic rotational-speed curve specifies a rotor rotational speed assumed to be maximal in dependence on the wind speed, and an accretion of ice on the rotor blade is detected if the recorded rotor rotational speed deviates from the reference rotational speed by at least a predetermined minimum-deviation rotational speed, or the recorded wind speed deviates by a predetermined minimum-deviation speed from the wind speed assigned to the recorded rotor rotational speed, wherein the minimum-deviation rotational speed is specified in dependence on the wind speed.

In particular, for full-load operation, it is proposed to consider the set blade angle and accordingly, in the case of the set blade angle being used as an operating variable for comparison with the reference variable, the recorded blade angle is compared with a reference angle of a characteristic blade-angle curve of the wind turbine. The characteristic blade-angle curve indicates a blade angle assumed to be optimal in dependence on the wind speed. The characteristic blade-angle curve thus indicates a behavior of the blade angle in dependence on the wind speed. This means that each wind speed, at least in full-load operation, can be assigned a blade angle that normally occurs during operation of the wind turbine at the wind speed in question.

In the case of consideration of the power, an accretion of ice on the rotor blade is detected if the recorded output power deviates from the reference power by at least a predetermined minimum-deviation power. In this case, the recorded output power is so much less than the output power to be expected at this wind speed that an accretion of ice is assumed.

For the recorded blade angle, the procedure is that this is examined to determine whether it deviates from the reference angle by at least a predetermined minimum-deviation angle. If there is a deviation of such a magnitude, an accretion of ice is assumed.

Alternatively, the assigned wind speed may in each case also be considered here. In the case of use of the characteristic operating-power curve, the output power is thus recorded and the characteristic operating-power curve is used to determine the assigned wind speed, with which, in turn, the recorded wind speed is compared. The comparison measure is then a predetermined minimum-deviation speed, and an accretion of ice is assumed if the absolute value is attained or exceeded.

Alternatively, in the case of use of the characteristic blade-angle curve, the assigned wind speed may also be considered in each case. The blade angle is thus recorded and the characteristic blade-angle curve is used to determine the assigned wind speed, with which, in turn, the recorded wind speed is compared. The comparison measure is then again a predetermined minimum-deviation speed, and an accretion of ice is assumed if the absolute value is attained or exceeded.

Accordingly then, the minimum-deviation power, the minimum-deviation angle or the minimum-deviation speed is in each case specified in dependence on the wind speed. The magnitude of the deviation by which the recorded output power deviates from the reference power before an accretion of ice is detected is thus variable, and is specified depending on the wind speed. The same applies to the minimum-deviation angle, which is likewise specified depending on the wind speed, and thus a variable tolerance is also proposed for the deviation between a recorded angle and the angle to be expected for the respective wind speed. These considerations also apply correspondingly to the alternatives in which the minimum-deviation speeds are considered and specified, since they are based on the same two characteristic curves. The consideration of the wind speeds can be advantageous in this case because the minimum-deviation speeds can be greater, relative to the recorded magnitude, than the minimum-deviation power or the minimum-deviation angle.

According to one embodiment, it is proposed that for wind speeds below a rated wind speed, the output power generated by the wind turbine from the wind be recorded as an operating variable. The generated output power will thus be used in partial-load operation as an operating variable to be recorded, and thus to be used to detect the accretion of ice.

For wind speeds above a rated wind speed, it is proposed that the blade angle set to limit the output power be recorded as an operating variable and used as a criterion for detecting an accretion of ice. Optionally, it is proposed that the wind turbine have an operating control that provides a transition range from partial-load operation to full-load operation. This transition range may be characterized by a first and a second switchover wind speed. The first switchover wind speed is below the rated wind speed, for example one meter per second or two meters per second below the rated wind speed. The second switchover wind speed is preferably above the rated wind speed, for example at least one meter per second (m/s) or at least two meters per second (m/s) above it.

If the wind turbine is then in this transition range, because the wind speed is in this transition range, a combined control is proposed in which the rotor blades are already turned slightly out of the wind, but the output power has not yet attained rated power, and consequently the wind turbine continues to be controlled on the basis of a rotational-speed power curve despite a slightly changed blade angle.

A control based on a rotational-speed power characteristic is also provided for the remaining partial-load operation. Alternatively, a rotational-speed torque characteristic could also be used. In the case of control based on a rotational-speed power characteristic, a rotational-speed power characteristic is specified which defines a relationship to be set between rotational speed and power. During operation, in each case the occurring rotational speed is recorded and the associated output power is set according to the rotational-speed power characteristic. The setting of the output power also results in an electromagnetic torque of the generator, which opposes the mechanical torque caused by the force of the wind on the rotor blades. If these two torques are equal, the wind turbine, i.e., its rotor, rotates at a constant rotational speed. If, however, the mechanical torque is greater, for example, this results in an acceleration of the rotor, such that the rotational speed of the rotor increases and then a new power is set on the basis of the rotational-speed power characteristic. This continues until a stable operating point is attained.

Such a control of the wind turbine based on the rotational-speed power characteristic may also be maintained in the transition range, but in this case the rotor blades are already adjusted in their blade angle, namely, in particular, turned out of the wind, at least by small values such as, for example, values in the range of from 1° to 5°, or in the range of from 1° to 10°.

Accordingly, it is proposed that, for such a transition range, i.e., for wind speeds between the first switchover wind speed and the second switchover wind speed, the generated output power and the set blade angle be each recorded as an operating variable. An accretion of ice is then assumed if the recorded output power for a reference power deviates by at least a predetermined minimum-deviation power, or the recorded blade angle deviates from the reference angle by at least a predetermined minimum-deviation angle. To that extent, one of these two criteria may be sufficient to infer an accretion of ice.

It is also possible, however, for both criteria to be monitored. In this case, it is preferably provided that an accretion of ice is assumed when one of these criteria is fulfilled. Preferably, this special situation in the transition range is taken into account in the selection of the predetermined minimum deviation. For example, both the predetermined minimum-deviation power and the predetermined minimum-deviation angle may have a lesser value than would be the case if only one of these two recorded variables were monitored as an operating variable.

This is based in particular on the realization that, in the case of an accretion of ice at wind speeds in the transition range, an operating point will be reached that, in respect of both the generated output power and the set blade angle, does not correspond to the operating point calculated in advance in the unaffected case, i.e., in the case without accretion of ice. The accretion of ice can then thus be seen from both the actually recorded output power and the actually recorded blade angle.

For all these variants, it is also possible that an accretion of ice is detected if the recorded wind speed deviates by a predetermined minimum-deviation speed from a wind speed assigned to the recorded output power or from a wind speed assigned to the recorded blade angle. The deviation of the operating variables, namely the output power or the blade angle, is then used indirectly, namely by consideration of the deviation between the recorded wind speed and the wind speed assigned to the recorded operating variable (output power or blade angle). If both operating variables are considered in combination, the wind speeds can also be compared. This then results in a respective deviation of the wind speeds for each of the two operating variables, and these two deviations can accordingly be considered in combination, in particular weighted and added up and compared with a predetermined minimum deviation adapted thereto, in order to detect or not an accretion of ice.

According to one embodiment, it is proposed that the characteristic blade-angle curve be specified depending on a temporarily specified reduced operating limit, in particular a reduced power limit and/or a reduced rotational-speed limit. A solution is thereby created in which the wind turbine operates in a reduced mode, in particular in a curtailed mode, in which the wind turbine, in particular due to external regulations, is temporarily not allowed to output more power than a curtailed power that is less than a rated power of the wind turbine, and in particular must output less power than would be available from the wind, and/or must be operated with a reduced rotational speed compared to a rated speed. For example, regulations of a grid operator of the electrical supply grid into which the wind turbine feeds can result in a reduction of power. Noise protection regulations can be the reason for a reduction of rotational speed and/or power. For this operation with a reduced operating limit, it is proposed to specify a separate characteristic blade-angle curve.

Optionally, it is proposed for this purpose that the predetermined minimum-deviation angle likewise be specified depending on the temporarily specified reduced power limit. For this operation with a temporarily reduced power, an accretion of ice can thus be detected by adjusting the monitoring criteria accordingly.

According to a further design, it is proposed that the minimum deviation be specified via a wind-speed dependent deviation curve. The deviation curve in this case indicates a behavior of the operating variable in dependence on the wind speed, and the deviation curve deviates from the operating-variable curve by the minimum deviation. If the minimum deviation relates to a deviation between an operating variable and a reference operating variable, it may also be referred to as a minimum operating deviation, and in that case the deviation curve is smaller than the operating-variable curve by the minimum operating deviation.

If the minimum deviation relates to a deviation between a wind speed assigned to the recorded wind speed and a wind speed assigned to the recorded operating variable, it may also be referred to as a minimum-speed deviation, and in that case the deviation curve is larger than the operating-variable curve by the minimum-speed deviation.

If the minimum deviation were constant, this would result in a shift of the deviation curve relative to the operating-variable curve. However, since the minimum deviation depends on the wind speed and is then not constant, depending on the wind speed, there is instead a varying distance between the operating-variable curve and the deviation curve.

According to one embodiment, it is proposed that the deviation curve be preferably not shifted by a constant wind speed value relative to the operating-variable curve, and/or that the deviation curve deviate from the operating-variable curve by wind speed values of differing magnitude. In particular, it was recognized that a constant shifting of the deviation curve relative to the operating-variable curve would result in the identified wind-speed-dependent relationships between the operating variable deviation and the accretion of ice being improperly, or even incorrectly, taken into account as a result of such a constant shift. It is therefore proposed not to effect such a shift, and instead to use different distances between the deviation curve and the operating-variable curve also in respect of the wind speed.

According to another embodiment, it is proposed that the predetermined minimum-deviation power, or minimum-deviation speed, increases with increasing wind speed, depending on what is being considered. This relates to partial-load operation, and there it is proposed that the predetermined minimum-deviation power become ever greater with increasing wind speed. In particular, it is proposed that the predetermined minimum-deviation power increases from a first start-up wind speed or a wind-speed-relevant threshold and/or continuously.

Optionally, it is proposed that the deviation of the recorded wind speed from the wind speed assigned to the recorded output power be recorded, and for this purpose the predetermined minimum-deviation speed, instead of the minimum-deviation power, is considered, and is treated in a manner analogous to the minimum-deviation power.

It was recognized, in particular, that in the case of low wind speeds even a slight deviation of the recorded output power from the predetermined output power can already indicate an accretion of ice. In particular, it was recognized that in the case of low wind speeds an accretion of ice results only in minor performance losses. At the same time, it was recognized that, in the case of low wind speeds, a low predetermined minimum-deviation power can also be specified in a comparatively reliable manner, because it was recognized that a wind speed measurement useful for this purpose is also possible with high accuracy because less turbulence is to be expected at low wind speeds, which increases the measurement accuracy. Preferably, in the case of very low wind speed, in particular below 4 m/s or 5 m/s, an increased minimum deviation is proposed.

In the case of higher wind speeds, it is therefore proposed to specify a higher minimum-deviation power. Such a high minimum-deviation power is also attained at high wind speeds, especially close to the rated wind speed, and at the same time this greater deviation can be compensated due to less precise measurement of the wind speed.

It is also proposed that the predetermined minimum-deviation angle initially decreases with increasing wind speed, in particular when the wind turbine is operating in a non-reduced mode. The same may apply if the wind turbine is only slightly reduced in its operation. OK, can stay. Here, it was recognized, in particular, that in the non-reduced case, the correction of the power is effected only at comparatively high wind speeds, namely at rated wind speed, which may be in the range of 12 meters per second. At the same time, in the non-reduced, i.e., non-curtailed mode, there is a correspondingly high power, namely rated power.

This operating point at the beginning of full-load operation represents an optimal operating point. This is because in this case, taking into account the design limits of the wind turbine, maximum power is extracted from the wind. The accretion of ice thus results in a very pronounced effect, resulting in a large deviation of the blade angle with, on the one hand, accretion of ice on the one hand and, on the other hand, without accretion of ice. With increasing wind speed, the blades are turned further out of the wind so that the power extraction from the wind does not exceed rated power. In this case, the rotor blades become increasingly aerodynamically inefficient as the wind becomes stronger, and this is precisely also the reason ultimately for adjusting the rotor blades as the wind speed increases, namely that they work more inefficiently in order to extract less power from the wind than would be possible. It was recognized that in this case additional aerodynamic deterioration due to accretion of ice with increasing wind speed is less important. It is thus proposed that the selected predetermined minimum-deviation angle should then be smaller.

At the same time, however, it has also been recognized that in operation with reduced power, at least provided that there is a significant reduction, a different relationship occurs. In this case, namely, the rotor blades are adjusted of the wind already at lower wind speeds, e.g., at wind speeds in the range of 8 meters per second (m/s). In this case, rotational speeds are also lower. The described performance-optimal point is not attained and deteriorations in aerodynamic efficiency due to ice build-up are therefore less noticeable at the beginning.

In this case, the influence of an accretion of ice can even increase as wind speed increases. It was recognized in this case that, in a comparison with non-curtailed full-load operation at the same wind speed, different blade angles pertain. This in turn also results in a different action of the wind on the rotor blade. This can also mean that the wind acts on different regions of the rotor blade in relation to the rotor radius. This can result in the accretion of ice having a more noticeable effect upon the blade angle. Furthermore, it was recognized that, in the reduced case at even higher wind speeds, the influence of the accretion of ice on the blade angle decreases again, and then effects as described above for full-load operation can occur.

It is therefore proposed that the predetermined minimum-deviation angle increase with increasing wind speed when the wind turbine is operating in a reduced mode in which the output power has been reduced to a power value of 50% or less, in particular below 40%, of a rated wind turbine power. Thus, allowing the predetermined minimum-deviation angle to increase with increasing wind speed is proposed for an operation that is significantly reduced, or limited, in its power output.

Optionally, it is proposed that the deviation of the recorded wind speed from the wind speed assigned to the recorded blade angle be recorded, and for this purpose the predetermined minimum-deviation speed, instead of the minimum-deviation angle, is considered, and is treated in a manner analogous to the minimum-deviation angle.

Preferably, the wind turbine is operated by means of a rotational-speed power characteristic, in which the output power of the wind turbine is set in dependence on a recorded rotational speed of the rotor. In particular, such an operation is the basis of the proposed detection of accretion of ice. In the case of such an operation by means of a rotational-speed power characteristic, the power is set in accordance with such a characteristic depending on the respective rotational speed. Such a rotational-speed power characteristic usually has a strictly monotonically increasing behavior, and to that extent the power is adjusted on the basis of this behavior of the rotational speed until a stable operating point is attained. This operating point provides information about the wind speed when the wind turbine is operating, and a different operating point would occur if the aerodynamics of the rotor blades are disturbed by accretion of ice. The proposed detection of accretion of ice is based on this insight, and therefore it is proposed to operate the wind turbine using a rotational-speed power characteristic. It should be noted that this particularly concerns partial-load operation, because once nominal rotational speed has been attained, such a characteristic can no longer be used.

Alternatively, a rotational-speed torque characteristic may be used instead of a rotational-speed power characteristic. The principle is quite similar, namely that a rotational-speed torque characteristic is specified and the torque is set in dependence on the respectively occurring rotational speed. The operating point is then corrected along the rotational-speed torque characteristic until a stable operating point is achieved. As a result, the torque also influences the output power and, to that extent, an operation that uses a rotational-speed power characteristic works in a manner equivalent to an operation that uses a rotational-speed torque characteristic.

According to one design, it is proposed that an accretion of ice on the rotor blade is detected only if a recorded outside temperature is below a predetermined maximum temperature. For this purpose, it is preferably proposed that the predetermined maximum temperature be specified depending on the wind speed. In particular, it was recognized that it is useful to additionally monitor the temperature. At temperatures significantly above freezing point, an accretion of ice is not to be expected. In addition, however, it was recognized that this predetermined maximum temperature is not exactly at the freezing point, but is often about 1 to 2 Kelvin above it. This is due to the fact that the accretion of ice also depends on how the moist air flows around the rotor blade. It was also recognized in this case that this predetermined maximum temperature, below which an accretion of ice should be checked in the first place, depends on the wind speed. It is therefore proposed that this predetermined maximum temperature be specified depending on the wind speed. In particular, it is proposed that the predetermined maximum temperature is lower in the case of lower wind speeds than in the case of higher wind speeds. Preferably, in the case of wind speeds below the rated wind speed, the freezing point is specified as the predetermined maximum temperature, and in the case of wind speeds above the rated wind speed, a value two Kelvin higher is specified.

Preferably, it is also checked whether the recorded outside temperature is above a predetermined minimum temperature that is lower than the predetermined maximum temperature. It was recognized here that at very low temperatures, in particular 10 Kelvin or more below the freezing point, an accretion of ice is also no longer to be expected, since at such low temperatures the air is usually so dry that no accretion of ice occurs. It is therefore proposed to use this as a further test criterion. Preferably, the predetermined minimum temperature is selected depending on the prevailing wind speed.

Preferably, the characteristic operating-variable curve is adapted during operation of the wind turbine. This is based on the concept that the behavior of a wind turbine can never be predicted exactly. For example, there may be production tolerances, and variations may also depend on the installation site. It is also possible that the behavior of a wind turbine can change over time, e.g., due to slight soiling and/or erosion of the rotor blades. Then the problem can arise that the criteria for detecting the accretion of ice become imprecise, or shift. In particular, the specification of the deviation curve is then problematic, because the deviation curve might no longer fit the actual situation, or the actual condition of the wind turbine at its installation site.

It was recognized, however, that this deviation curve, or the minimum deviation, can be adapted only with difficulty during operation. In particular, during ongoing operation it is difficult to check at which deviations an accretion of ice has actually occurred. This is particularly due to the fact that an accretion of ice situation may not occur frequently. It was recognized, however, that the characteristic operating-variable curve can be recorded and adapted during operation of the wind turbine instead. Especially at temperatures significantly above freezing point, it can be assumed that there is no accretion of ice and thus deviations of the operating-variable curve must reflect normal operation. Continuous observation of the operating variable and comparison with the wind speed, which is likewise continuously monitored, thus enables the characteristic operating-variable curve to be adapted in a simple manner during operation of the wind turbine. If the minimum deviation is now applied on this basis, i.e., on the new adapted operating-variable curve, this also results in an improved basis for detecting an accretion of ice. The deviation curve can then also be adapted on the basis of the adapted operating-variable curve, which is preferably proposed.

It is additionally or alternatively proposed that, for the characteristic operating-variable curve during operation of the wind turbine, operating deviations are recorded that indicate deviations of a recorded operating variable from an operating variable according to the characteristic operating-variable curve. In other words, a normal spread of the operating variable around the characteristic, and thus ideal, curve is recorded. It must be ensured that only such spreads, i.e., recorded deviations, are recorded that are not due to an accretion of ice. This can be ensured, in particular, by recording such deviations only at correspondingly high temperatures, when an accretion of ice can be excluded.

In connection with this it is then proposed that the minimum deviation in each case be selected such that it is greater in magnitude than the corresponding operating deviation. The minimum deviation is specified in dependence on the wind speed, and therefore it is also proposed here that the minimum deviation in each case be selected at different wind speeds, such that, in relation to the wind speed in question, it is greater than the corresponding operating deviation of the wind speed in question. Preferably, such a specification of the minimum deviation, or change in the minimum deviation depending on the wind speed, may be effected in wind-speed increments, e.g., every 1 meter per second (m/s). Thus, if the minimum deviation for each wind speed is selected to be greater than the recorded deviations, in particular only slightly greater, a very good and at the same time adapted criterion for detecting the accretion of ice can be specified, which moreover also takes into account different wind speeds in respect of the magnitude of the deviation.

In particular, the deviation curve is selected, or changed, such that the operating-variable curve with the operating deviations does not fall below the deviation curve or, depending on the sign, exceed it. The operating-variable curve may thus be regarded as a curve around which the recorded deviations lie as scatter values. To express it illustratively, the deviation curve is then ideally placed along the outer values of the scatter. As a result, the deviation curve can thus also still be adapted without the necessity of waiting for a large number of ice accretions for adapting.

Preferably, it is proposed that the operating deviations be recorded as standard deviations and, additionally or alternatively, that the operating deviations be combined as a deviation band, and the deviation curve be selected and/or changed such that it lies below the deviation band relative to the values of the operating variable, and/or that the respective minimum deviation, or the deviation curve, be adapted during operation of the wind turbine, in particular in dependence on the adapted characteristic operating-power curve and/or in dependence on the recorded operating deviations. The recorded deviations are thus recorded, as already described above, and may be used to evaluate or redefine the evaluation criterion for detecting the accretion of ice. In particular, in the case of the output power being considered as an operating variable, the deviation curve, correspondingly namely the deviation power curve, lies below the operating curve. The same applies if a blade angle that is set to limit the output power is in each case used as an operating variable, and the blade angle is basically defined such that a normal operating position of the rotor blade in partial-load operation is approximately in the range of 0 degrees or a few degrees, and a blade angle in the feathered position corresponds to a value of approximately 90 degrees.

According to one embodiment, it is proposed that the respective minimum deviation, or the deviation curve, be specified depending on an ambient temperature of the wind turbine. It was recognized in connection with this that the outside temperature can have a particular influence on how quickly ice forms on the rotor blade. This in turn can also influence how the ice accumulates on the rotor blade, i.e., how such an accretion of ice grows, which can affect the operating point.

According to one embodiment, it is proposed that the respective minimum deviation, or the deviation curve, depends, in addition to the wind speed, on at least one further property of the wind acting upon the rotor. These properties include a turbulence intensity of the wind, a vertical shear of the wind, a horizontal shear of the wind, a wind direction and a change in wind direction over height. At least one of these wind properties is thus additionally taken into account in order to specify the minimum deviation, or deviation curve.

It was recognized in this case that the predetermined minimum deviation, above which an accretion of ice can be inferred, does not only have to depend on the wind speed. In particular, it was recognized in this case that the influence of wind speed can also depend on other wind criteria. Thus, for example, an accretion of ice can have a different influence on a laminar flow than on a turbulent flow, even at the same wind speed. The same applies to wind shear, whether vertical or horizontal. In this case, the wind acts with differing intensity on the rotor, or the respective rotor blade, in different positions and thus the influence of an accretion of ice is also different. The same applies to a wind direction and also to a change in wind direction. A wind direction in particular can also have an influence depending on the location, especially if it is known that air of differing humidity can usually be expected from different wind directions.

The stated properties of the wind may also be referred to as wind-field parameters, and to that extent it is proposed that the respective minimum deviation, or the deviation curve, be specified depending on at least one wind-field parameter. In particular, it is proposed that these properties of the wind acting upon the rotor constitute wind parameters, and that the wind be classified in dependence on at least some of these wind-field parameters, and that the minimum deviation be predetermined depending on this classification. Here it was recognized in particular that a dedicated consideration of the individual properties of the wind acting upon the rotor is not necessary, and rather a general classification may be sufficient. For example, a classification may be made in such a way that, on the basis of the wind-field parameters, the wind is classified as particularly even, less even, somewhat uneven and very uneven. Depending on this evenness, which is only one possibility for classification of the wind field, the minimum deviation is then predetermined.

In particular, for this purpose such parameters may be determined in wind turbines, e.g., with nacelle-based LIDAR measurement systems.

In order to establish a connection between this wind-field classification, or the classification based on the wind-field parameters and the operating variable deviation, as soon as ice is detected on the rotor blade, the wind-field parameters measured could be compared with the corresponding situation with the same wind-field classification in the ice-free state. For this purpose, corresponding data of the wind turbine for different wind-field classes, i.e., different classifications of the wind-field parameters, were recorded and stored together with the corresponding wind-field classification. In particular, corresponding operating variables were thus recorded and stored. These data, which to that extent may also be referred to as historical data, can then be compared in the event of a detected accretion of ice, and thus in particular the difference between ice-free operation and operation with accretion of ice can be compared for the respective wind-field class. The deviations may thus also be recorded in each case as criteria for an accretion of ice. If the minimum deviation determined in this way is exceeded, accretion of ice can be inferred. The classification enables the influence of the wind-field parameters, or the dedicated consideration of the influence of the wind-field parameters, to be reduced to a low level, in particular to a minimum level.

According to one embodiment, it is proposed that the respective minimum deviation, or the deviation curve, depend on a blade profile of the rotor blade, or on the blade profiles of the rotor blades of the rotor, which, however, should all be identical in the case of a rotor, or wind turbine. Here it was recognized in particular that the design of the rotor blade, which in particular is reflected in the blade profile, has an influence on how strong the effects of an accretion of ice on the operation of the wind turbine are. Thus, it has an influence on the minimum deviation to be expected due to an accretion of ice.

A rotor blade of a wind turbine varies in its blade profile from the blade root to the blade tip, but usually a characteristic, e.g., average, blade profile can still be assumed for the blade. Preferably, it is proposed that the stated dependence of the minimum deviation, or deviation curve, relates to the blade profile according to a profile section at a position of from 50 to 95% of the rotor radius, i.e., from the rotation axis to the blade tip. Preferably, it relates to the blade profile at 80% to 95%, in particular at 90% of the rotor radius.

In particular, it is proposed here that preliminary investigations, which are also performed as simulations, be carried out. In particular, it is proposed here that minimum deviations or deviation curves for different rotor blades, and thus different blade profiles, be recorded in simulations.

According to one design it is proposed that, for the purpose of detecting an accretion of ice, it is checked several times in a predefined test period whether the recorded operating variable deviates from the reference value by at least a predefined minimum deviation, and an accretion of ice is only assumed if the test was positive several times, in particular if it was predominantly positive in the predefined test period. A faulty measurement, for example in the measuring of the wind speed, can thereby be prevented from resulting in the minimum deviation being exceeded and then an accretion of ice being assumed, although none is actually present. In other words, a false alarm or a false detection of an accretion of ice is avoided. For this it is therefore proposed that the measurement over the specified test period leads in a sustained manner to the result that an accretion of ice is present. At least, the minimum deviation should be reached at least twice during the specified test period, which may be in the range of 5 seconds to 1 minute, for example. Preferably, this minimum deviation should be attained during the entire test period, and thus it can be considered that if a positive test is followed by a negative test, the first positive test is discarded again and the next positive test is then regarded as the first value. One possibility is that, during the test period, a minimum number of positive tests must have occurred that is greater than the number of negative tests.

According to one design, it is proposed that three equally sized sections are considered from a lower wind-speed range, which extends from a start-up wind speed at which the wind turbine starts up, or from a wind-speed-relevant threshold, which denotes a wind speed above the start-up wind speed and in particular has values up to 4 m/s or 5 m/s, to a rated wind speed. Each of these three sections thus forms one third of the lower wind-speed range. Of these, a first wind-speed section extends from the start-up wind speed to a first section wind speed. A second wind-speed section extends from the first section wind speed to a second section wind speed. The second wind-speed section thus forms the middle third of the lower wind-speed range. Finally, a third wind-speed section extends from the second section wind speed to the rated wind speed. The third wind-speed section thus forms the last, or upper, third of the lower wind-speed range.

The following is proposed for these three wind-speed sections. It is proposed that the minimum deviation in each of the three wind-speed sections increase with increasing wind speed, and also that the minimum deviation increase continuously from the first wind-speed section to the third wind-speed section with increasing wind speed. It is therefore proposed that the minimum deviation increases with increasing wind speed, both for the ranges within the three sections and for the overlapping range from the first to the third wind-speed section.

Thus, for the minimum deviation, a very concrete, substantially sustained increase is proposed for the entire partial-load operation, which may only start from a wind-speed-relevant threshold, wherein the wind-speed-relevant threshold may have values of up to 5 m/s, preferably up to 4 m/s. Here it was recognized in particular and implemented by the proposals that the minimum deviation, which indicates an accretion of ice, increases in a sustained and continuous manner, and in particular also significantly with the wind speed, not only for a small range. This increase in partial-load operation, which may also be referred to synonymously as the partial-load range, is in particular proposed for an output power, generated by the wind turbine from the wind, being recorded as an operating variable, and thus the minimum deviation relating to a deviation relative to a reference power. The power deviation from which an accretion of ice is deduced is thus continuously and significantly increased with increasing wind speed substantially over the entire partial-load operation.

It is additionally or alternatively proposed that, in addition to the minimum deviation in each of the three wind-speed sections increasing with increasing wind speed, a mean minimum deviation of the third wind-speed section be at least 50% above a mean minimum deviation of the second wind-speed section, and the mean minimum deviation of the second wind-speed section be at least 50% above a mean minimum deviation of the first wind-speed section. At least one of these two criteria should be present.

However, if both criteria are preferably present, the mean minimum deviation of the third wind-speed section is more than twice as high as the mean minimum deviation of the first wind-speed section. The minimum deviation therefore increases significantly with increasing wind speed in partial-load operation. This also preferably applies to the case in which the output power generated by the wind turbine is considered as the operating variable, and accordingly the minimum deviation relates to the deviation of the output power in relation to a reference power. Here, however, it is in particular also possible that the operating variable is a torque, in particular a generator torque of the wind turbine, and accordingly the minimum deviation relates to a deviation of this torque, or generator torque, from a reference torque.

Also proposed is a wind turbine, and such a wind turbine comprises a rotor that has at least one rotor blade, and the rotor can be operated with a variable rotational speed. This wind turbine comprises a control unit (e.g., controller) that is configured to detect an accretion of ice on the at least one rotor blade. The wind turbine and, in particular, the control unit are in particular configured to execute a method according to at least one embodiment described above.

The wind turbine also has a wind measuring means for recording a wind speed of a wind acting upon the rotor. This may be a nacelle anemometer or a LIDAR measuring device, to name two examples. It is also possible that a plurality of wind measuring means are present so that measurement redundancy can be ensured. Preferably, a plurality of wind measuring means may be used in order to increase measurement accuracy.

In addition, a recording means (e.g., memory) is provided, which records an operating variable that is dependent on the wind speed. This may be, in particular, an output power or a blade angle. The recording may be effected in such a way that information or signals about the desired operating variable are already available in a control computer of the wind turbine, in particular in the control unit, and the recording means merely retrieves and further processes this information. The recording means in this case may also be part of the control unit.

Also provided is a comparator, for comparing the recorded operating variable or the recorded wind speed with a reference variable of a characteristic wind-speed dependent operating-variable curve of the wind turbine. This comparator may be part of the recording means and/or it may be part of the control unit. The characteristic operating-variable curve may be, for example, a wind-speed dependent power curve and/or a wind-speed dependent blade-angle curve.

Also provided is an evaluation unit (e.g., controller), which is configured to detect an accretion of ice on the rotor blade if the recorded operating variable, or the recorded wind speed, deviates from the reference variable by at least a predetermined minimum deviation. The evaluation unit may be a separate process computer or be part of the control unit, the recording means and/or the comparator.

Also provided is a specification unit (e.g., controller), which is configured to specify the minimum deviation in dependence on the wind speed. For this purpose, the specification unit receives a wind speed value, which it obtains in particular from the wind measuring means, or from a downstream estimator means (e.g., anemometer or LIDAR), and which specifies the minimum deviation in dependence thereon. The specification unit may also be part of one of the aforementioned means, in particular part of the control unit. The specification of the minimum deviation may also consist in the storing of a wind-speed-dependent deviation curve, which the evaluation unit accesses when it checks whether the recorded operating variable deviates from the reference variable by at least a predetermined minimum deviation. This would be the case if the operating variable attains or falls below the deviation curve.

BRIEF DESCRIPTION OF THE SEVERAL VIEWS OF THE DRAWINGS

The invention is now explained in more detail below on the basis of exemplary embodiments, with reference to the accompanying figures.

DETAILED DESCRIPTION

Figure 1:
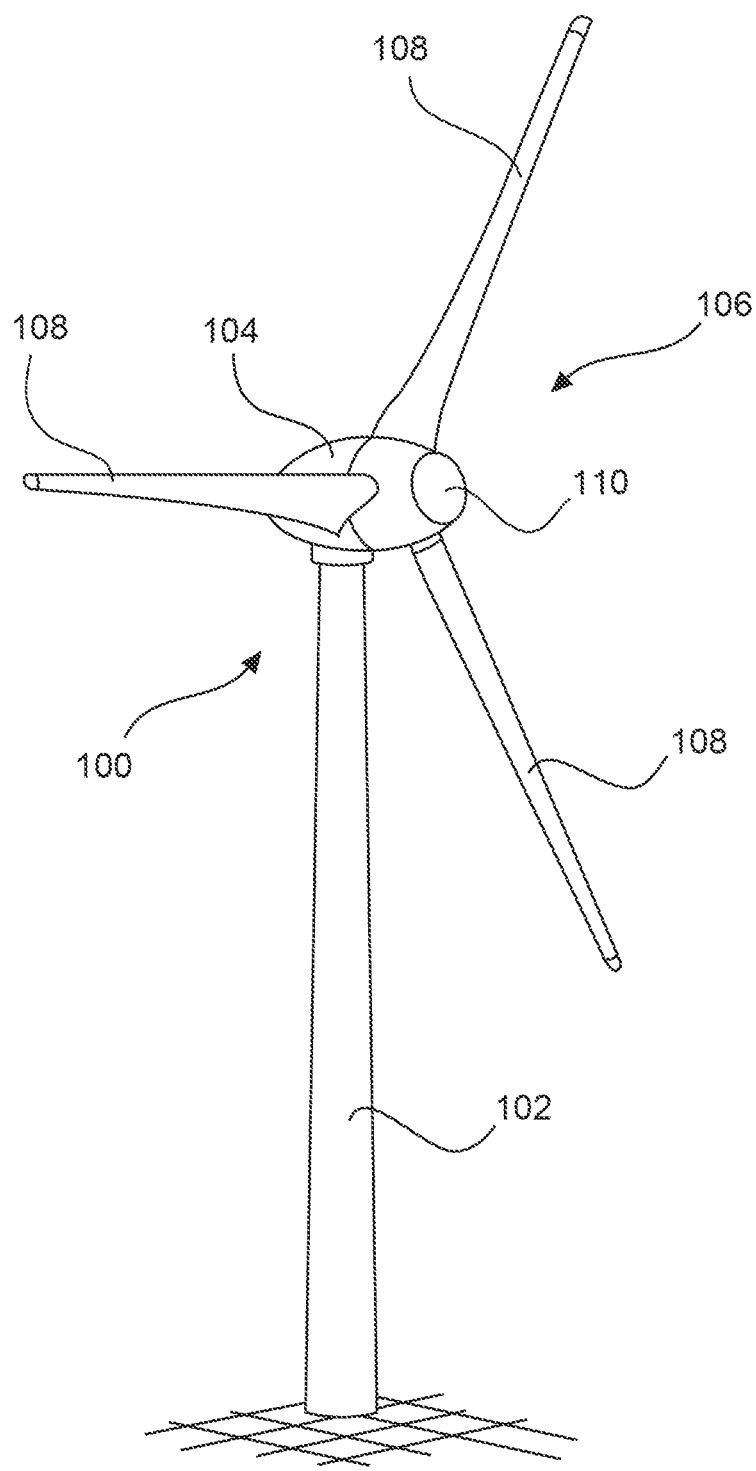
FIG. 1 shows a wind turbine in a perspective representation.

FIG. 1 shows a wind turbine 100 having a tower 102 and a nacelle 104. Arranged on the nacelle 104 is a rotor 106 that has three rotor blades 108 and a spinner 110 is. During operation, the wind causes the rotor 106 to rotate, thereby driving a generator in the nacelle 104.

Figure 2:
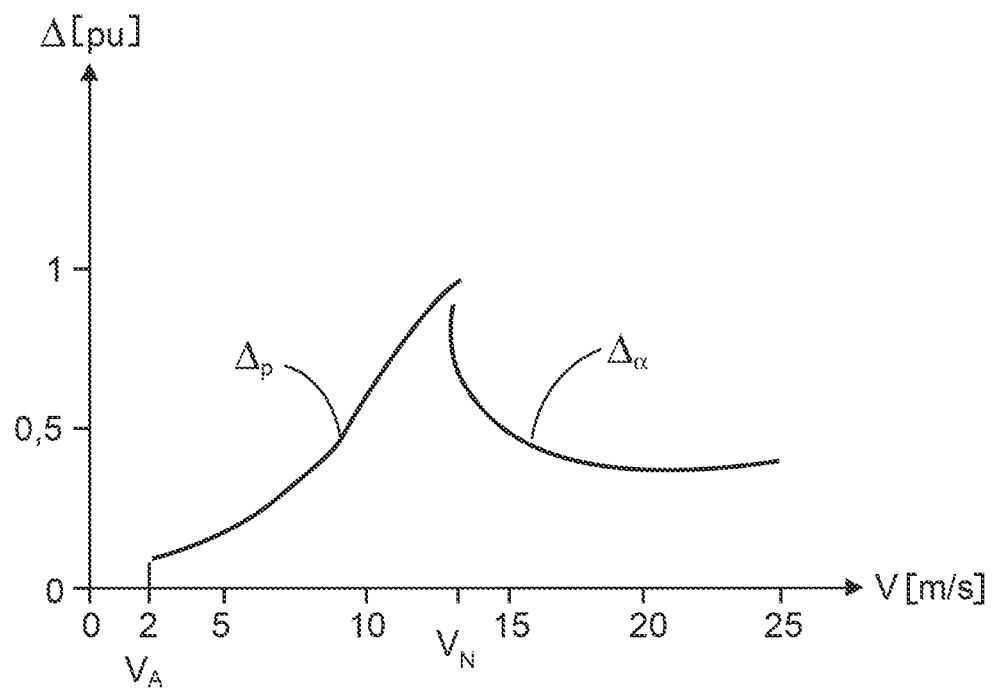
FIG. 2 shows a diagram of a deviation of an operating variable between normal operation and operation with accretion of ice.

FIG. 2 shows a diagram of the behavior of a deviation Δ of a recorded wind speed from a wind speed assigned to a recorded operating variable, and the deviation, which is thus called the wind speed deviation, is represented as a function of the wind speed V. The wind speed V is plotted on the abscissa with the unit m/s. The deviation Δ is normalized to a deviation measure. The deviation at rated wind speed $V_N$ may be used as a deviation measure for normalization. It was recognized that such wind speed deviations between normal operation and operation with accretion of ice depend on the wind speed and therefore further investigations were carried out. In simulations, operating variables in an operation without accretion of ice were compared with respectively the same operating variable in an operation with accretion of ice, and the deviations that resulted for the assigned wind speeds were considered in dependence on wind speed. Such a result is represented in FIG. 2. In a partial-load operation from a start-up wind speed $V_A$ to the rated wind speed $V_N$, FIG. 2 shows the deviation of a wind speed assigned to the recorded output power, which is denoted to here as the wind speed deviation $\Delta_P$ assigned to the output power, between undisturbed operation and operation with accretion of ice. The representation in FIG. 2, and the same applies to FIG. 3, shows the behavior of the respective deviation in terms of magnitude.

It can be seen that at the start-up wind speed $V_A$, which here is about 2 m/s, the wind speed deviation $\Delta_P$ has a comparatively low value of about 0.1. Up to the rated wind speed $V_N$, this wind speed deviation $\Delta_P$ assigned to the output power increases to about the value 1. From this was derived the concept that a minimum deviation should likewise increase from the start-up wind speed $V_A$ to the rated wind speed $V_N$, and the minimum deviation should in each case be somewhat less than the shown wind speed deviation $\Delta_P$ assigned to the output power.

At rated wind speed $V_N$, for instance, the wind turbine is operated at rated power and the rotor blades are then gradually turned further out of the wind as wind speed increases. Therefore, from rated wind speed $V_N$ onwards, a blade angle is considered as an operating variable for detecting an accretion of ice. FIG. 2 in this connection shows the deviation of the wind speed assigned to the blade angle, which is referred to here as the wind speed deviation $\Delta_\alpha$ assigned to the blade angle, for operation without accretion of ice and with accretion of ice. Here, too, the deviation is shown according to magnitude. Here, too, it was found that the wind speed deviation $\Delta_\alpha$ assigned to the blade angle between normal operation and operation with accretion of ice depends on the wind speed. It was found in this case that the dependence is such that the wind speed deviation $\Delta_\alpha$ assigned to the blade angle substantially decreases with increasing wind speed. From this, the rule was derived that a minimum deviation for the wind speed deviation assigned to the blade angle for detecting an accretion of ice is also to be specified depending on the wind speed, but in such a way that the minimum deviation is of a somewhat lesser magnitude than the examined wind speed deviation assigned to the blade angle for operation with and without accretion of ice.

Figure 3:
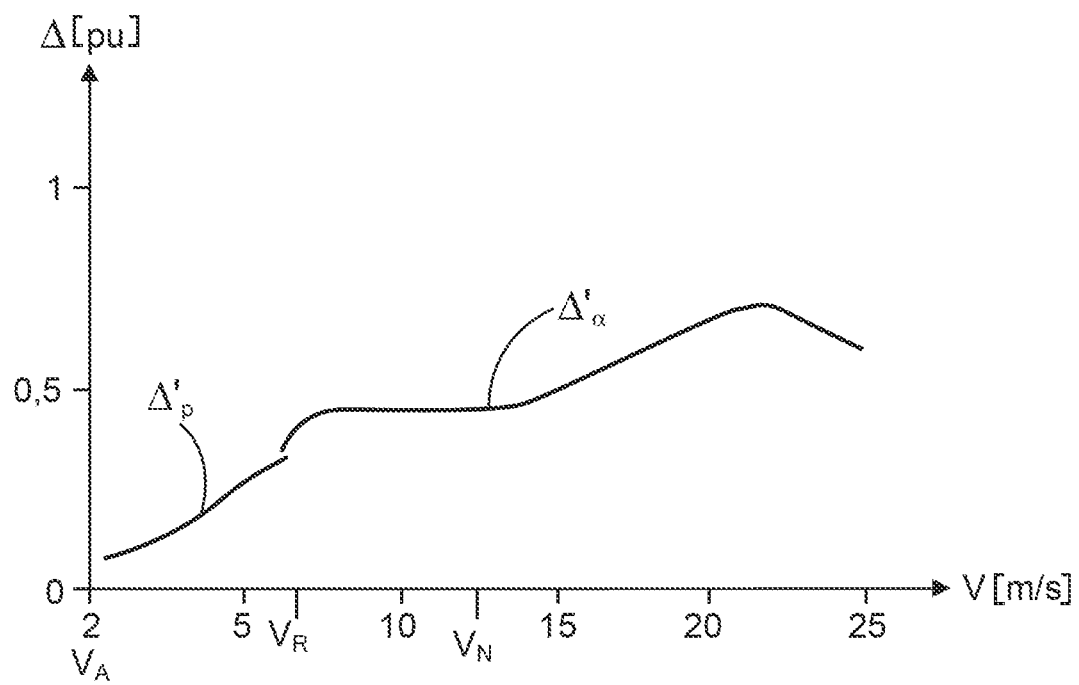
FIG. 3 shows a diagram similar to FIG. 2, but for limited-power operation.

FIG. 3 shows basically a very similar diagram to FIG. 2, but with the difference that here the wind turbine is strongly curtailed. It is in fact curtailed to a power that it would attain in partial-load operation at about 8 meters per second (m/s). In the figure, this wind speed is plotted on the abscissa as reduced wind speed $V_R$. It is thus also only expedient to consider the output power up to this reduced wind speed $V_R$, and therefore the diagram of FIG. 3 includes a wind speed deviation $\Delta_P'$ assigned to the output power only from the start-up wind speed $V_A$ up to this reduced wind speed $V_R$. It should be noted that the representation of FIG. 3, in contrast to the representation of FIG. 2, does not start at 0, but at the start-up wind speed $V_A$, which is technically irrelevant. Preferably, it is proposed that the wind speed deviation assigned to the output power be increased with increasing wind speed only from a wind-speed-relevant threshold, which in this case describes a wind speed of approximately 3 m/s.

The behavior of the wind speed deviation $\Delta_P'$ assigned to the output power in FIG. 3 corresponds in principle, also quantitatively, to the behavior of the wind speed deviation $\Delta_P$ assigned to the output power in FIG. 2, except that in FIG. 3 the behavior of the wind speed deviation $\Delta_P'$ assigned to the output power ends at the reduced wind speed $V_R$.

Thus, the blade pitch control takes over the control of the wind turbine from the reduced wind speed $V_R$ onwards. Accordingly, the behavior of a wind speed deviation $\Delta_\alpha'$ assigned to the blade angle is investigated and represented from the reduced wind speed $V_R$ onwards. However, the behavior of the wind speed deviation $\Delta_\alpha'$ assigned to the blade angle in the case of curtailed operation according to FIG. 3 differs significantly from the behavior of the wind speed deviation $\Delta_\alpha$ assigned to the blade angle in FIG. 2. In FIG. 3, it can be seen that the behavior of the wind speed deviation $\Delta_\alpha'$ assigned to the blade angle increases, starting from the reduced wind speed $V_R$, with increasing wind speed, even beyond the rated wind speed $V_N$. Only at high wind speeds of over 22 meters per second (m/s) is there a slight decrease.

From this, it was derived as a control rule to set the minimum deviation for the wind speed deviation assigned to the blade angle lower with increasing wind speed in the case of non-curtailed operation of the wind turbine, whereas, in the case of a significantly curtailed wind turbine it is set higher with increasing wind speed.

Figure 4:
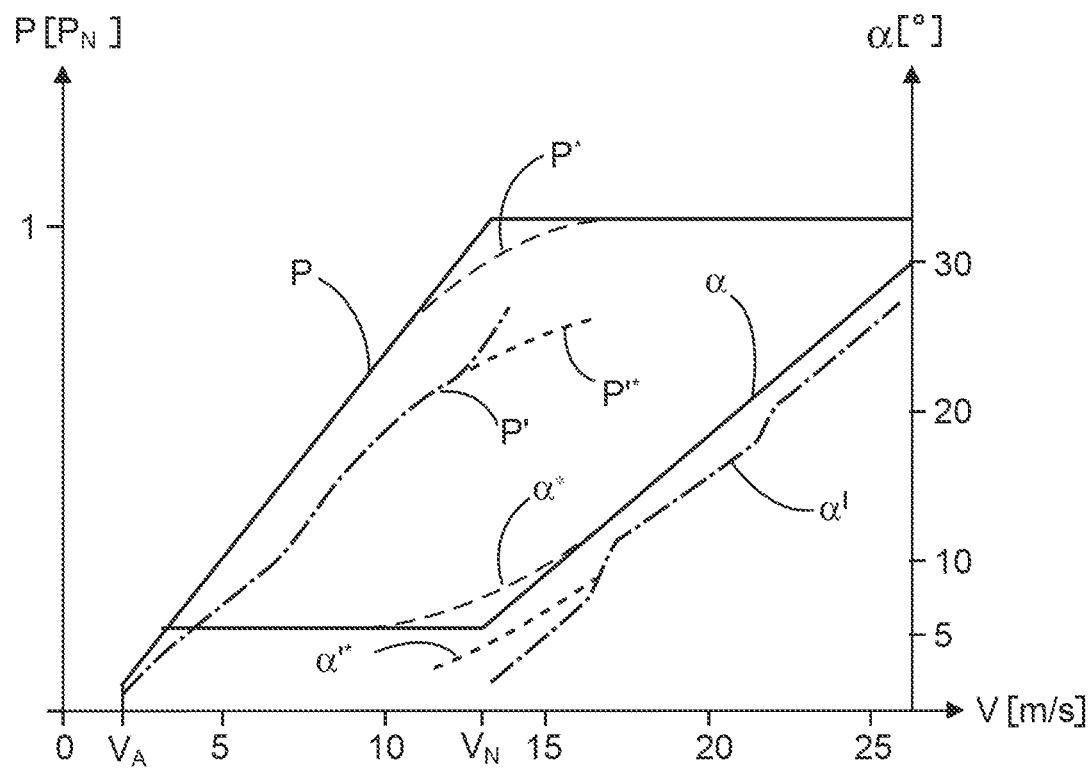
FIG. 4 shows a diagram with wind-speed-dependent behaviors of operating variables together with proposed minimum deviations, or assigned deviation curves.

Shown schematically in FIG. 4 is a diagram with a power curve P and a blade angle curve $\alpha$. In particular, the linear behaviors of the power P and of the blade angle $\alpha$ are highly simplified and serve as illustration.

FIG. 4 is based on a closed-loop control concept in which the wind turbine is started when the wind speed V attains the start-up wind speed $V_A$. This start-up wind speed $V_A$ is selected in such a way that a small amount of power can already be generated. In partial-load operation, which extends from the start-up wind speed $V_A$ to the rated wind speed $V_N$, a higher power P can be generated with increasing wind speed. The closed-loop control system may be designed in such a way that a rotational-speed power characteristic is used as a basis and, based on this rotational-speed power characteristic, a power P is set depending on a recorded rotational speed. Ideally, this results in a value on the power curve P for each wind speed V. This dependency is known, or should be known, as precisely as possible.

When the wind speed attains the rated wind speed $V_N$ and continues to increase, the power P attains the value of the rated power $P_N$. Until then, the blade angle $\alpha$ has remained constant, in the example at 5°. From the rated wind speed $V_N$ onwards, however, the rotor blades are then turned out of the wind as the wind speed increases, and the blade angle $\alpha$ increases accordingly as the wind speed continues to increase. A blade angle $\alpha$ that is dependent on the wind speed can also be derived from this. This is shown by the correspondingly solid blade-angle curve for the blade angle $\alpha$.

Both the power P and the blade angle $\alpha$ each form an operating variable of the wind turbine. This operating variable is now monitored to ascertain whether it falls below the deviation curve, which is shown as a dotted line in FIG. 4. For partial-load operation, the power P is the relevant operating variable, and the associated deviation curve accordingly shows the behavior of a power P'. If the power P' falls below this deviation curve, an accretion of ice is assumed.

Correspondingly, a deviation curve for the blade angle $\alpha'$ for the wind-speed range from the rated wind speed $V_N$ is also plotted with a dotted line. If the blade angle $\alpha$ falls below the deviation curve of the blade angle $\alpha'$ in this range, an accretion of ice is assumed.

It is now proposed that the minimum deviation for both the operating variable of the power P and the operating variable of the blade angle $\alpha$ be specified in dependence on the wind speed. This means that the respective deviation curve deviates from the assigned operating-variable curve to a different extent depending on the wind speed. For partial-load operation, the minimum deviation in this case increases with increasing wind speed. Accordingly, the distance between the power curve P and the deviation curve of the power P' increases with increasing wind speed.

Alternatively, here too the assigned wind speed may be considered, i.e., in illustrative terms, the deviation between the power curve P and the deviation curve of the power P' in the horizontal direction. This also increases with increasing wind speed.

For the blade angle as an operating variable in full-load operation, i.e., from rated wind speed $V_N$, it is proposed that the minimum deviation become smaller with increasing wind speed. The distance between the operating-variable curve of the blade angle α and the deviation curve of the blade angle α' therefore decreases with increasing wind speed. Both the deviation curve of the P' and the deviation curve of the blade angle α' have indicated steps at which the distance between the deviation curve and the assigned operating-variable curve then changes. However, this is only one possibility for changing the respective underlying minimum deviation and a straight behavior of each of the deviation curves may also be considered.

Alternatively, here too the assigned wind speed may be considered, i.e., in illustrative terms, the deviation between the operating-variable curve of the blade angle α and the deviation curve of the blade angle α' in the horizontal direction. This also decreases with increasing wind speed.

FIG. 4 additionally shows a variation, namely that a transition range from partial-load operation to full-load operation is provided. According to such a transition range, the rotor blades are already adjusted before attaining the rated wind speed $V_N$, this being represented by a dashed line and marked as blade angle α*. As a result, the power P is also reduced somewhat earlier, and accordingly a power P* is also plotted with a dashed line for the transition range. Accordingly, the respective deviation curve also changes for the range and this changed section is plotted as a dotted line section for both the deviation curve of the power P'* and for the deviation curve of the blade angle α'*. In the transition range, it is thus proposed to monitor, both for the deviation curve of the power P'* and for the deviation curve of the blade angle α'*, whether the corresponding operating variable falls below the corresponding deviation curve.

Figure 5:
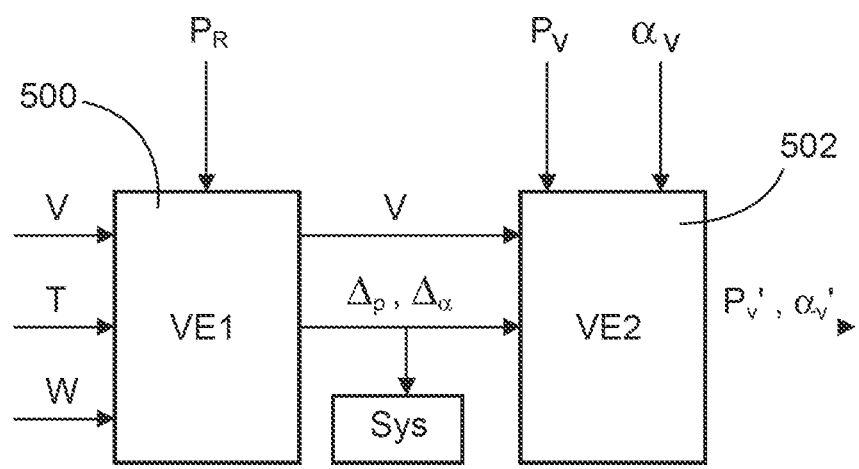
FIG. 5 shows a schematic block diagram for determining deviation curves.

FIG. 5 shows an embodiment of a first specification unit (e.g., controller) 500, which receives a wind speed V, an outside temperature T and wind field data W as input variables. In addition, the specification unit 500 takes into account whether the wind turbine is curtailed, and if so, to what extent. For this purpose, it receives the curtailment power $P_R$. If this curtailment power $P_R$ corresponds to the rated power of the wind turbine, it is not curtailed. However, if it is significantly lower, for example, and only has a value of, for example, 40% of the rated power $P_N$, the specification unit 500 detects that reduced, or curtailed, operation is in effect.

Depending on these input variables, a minimum deviation for the power $\Delta_P$ and a minimum deviation for the blade angle $\Delta_\alpha$ are then determined. These may be used directly as criteria for detecting an accretion of ice. Alternatively, a minimum deviation for an assigned wind speed may be determined in each case in order to detect an accretion of ice in dependence thereon.

Alternatively or additionally, a deviation curve for the power $PV'$ and a deviation curve for the blade angle $\alpha_V'$ may be determined in dependence thereon in a second specification unit (e.g., controller) 502. For this purpose, the second specification unit 502 requires, in addition to the respective minimum deviations, the operating-variable curves, namely for the power $P_V$ and the blade angle $\alpha_V$. In addition, the assignment to the respective wind speed V is required and for this purpose the wind speed V may be transferred from the first specification unit 500 to the second specification unit 502. Alternatively, a minimum deviation for an assigned wind speed may be determined in each case and transferred to the specification unit 502.

Figure 6:
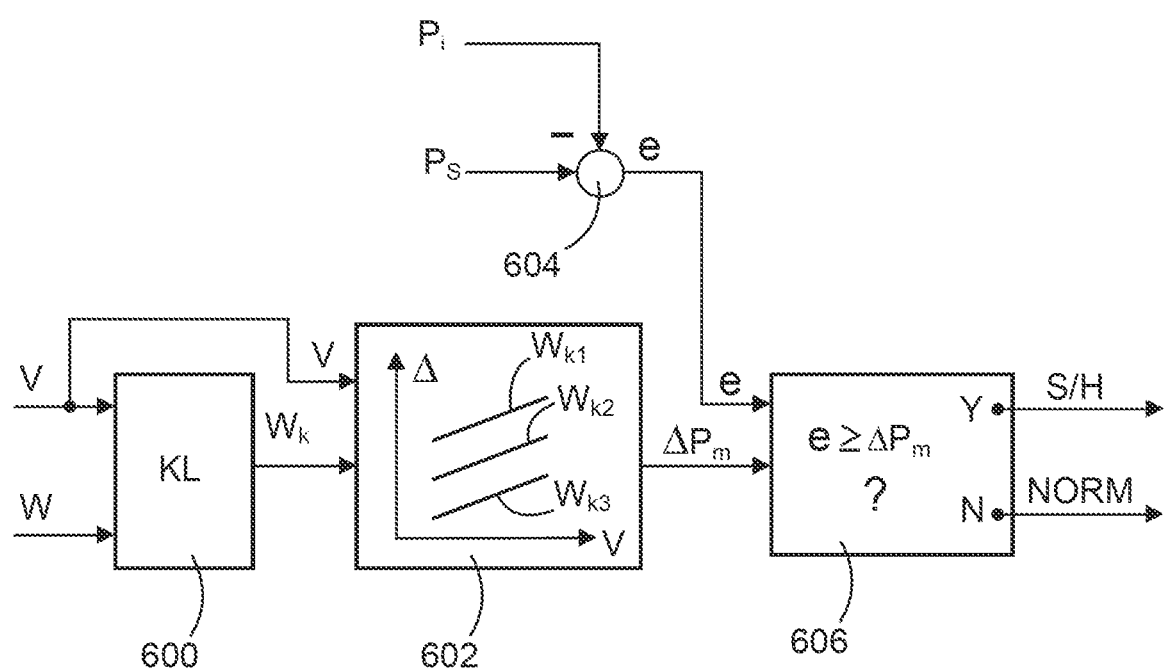
FIG. 6 shows a block diagram for a variant for detecting an accretion of ice based on a wind classification.

FIG. 6 shows a variant that takes at least the wind speed V and wind-field parameters W into account for the detection of an accretion of ice. For this purpose, these parameters are transferred to a classification block (e.g., controller). From these parameters the classification block 600 derives a wind class. This wind class is then transferred to a specification block (e.g., controller) 602, which additionally receives the wind speed V as an input variable. The specification block 602 then calculates a minimum deviation $\Delta P_m$ from the wind speed and the determined wind class WK. FIG. 6 to that extent describes an example in which the considered operating variable represents the power of the wind turbine. This may also be applied equally and simultaneously to other operating variables such as, for example, the blade angle. Alternatively, the assigned wind speed may likewise be considered in each case instead of the operating variables.

The specification block 602 may make use of a stored characteristics map, which is indicated in the block 602 in FIG. 6. Such a characteristics map may have various wind-speed-dependent minimum deviations, and an example of this is shown in specification block 602, according to which three behaviors of the minimum deviation Δ, which are dependent on the wind speed V, are plotted and are marked as $W_{k1}$, $W_{k2}$ or $W_{k3}$ according to wind class.

The specification block 602 therefore selects a corresponding characteristic depending on the wind class $W_k$, which it has received from the classification block 600. Depending on the wind speed V, which it also receives, the specification block 602 then selects the specific minimum deviation Δ according to the specifically selected characteristic, namely depending on the wind speed V. The result is output and is shown at the output of the specification block 602 as a predetermined minimum deviation $\Delta P_m$.

For the purpose of evaluation, a comparison is first made with the measured power $P_i$ and the specified power Ps. The predetermined power $P_S$ may be taken from a specified wind-speed power curve, which is not shown further in FIG. 6. The comparison may be made by a difference in the summing element (e.g., controller) 604. Alternatively, wind speeds may also be compared here by using a measured, i.e., recorded, wind speed instead of the measured power $P_i$. In addition, the assigned wind speed is determined, thus for example, read off, with the measured power $P_i$ in a specified wind-speed power curve, which may be referred to as a characteristic operating-power curve. This assigned wind speed is then input into the summing element 604 as the assigned wind speed for difference formation with the measured wind speed, instead of the specified power $P_S$.

The result of this comparison, be it the comparison of the operating variables or of the wind speeds, is marked as deviation e in FIG. 6. This deviation e and the predetermined minimum deviation $\Delta P_m$ are then input into the evaluation block (e.g., controller) 606. If the deviation of the wind speeds is used, the predetermined minimum deviation $\Delta P_m$ is of course adjusted thereto accordingly.

In the evaluation block 606, it is checked whether the deviation e is greater than or equal to the predetermined minimum deviation $\Delta P_m$. If this is the case, an accretion of ice is assumed and the wind turbine can then be stopped and, in addition or alternatively, a heating process may be started in order to thaw the ice from the rotor blades. This is marked as S/H at the output of evaluation block 606.

Otherwise, the wind turbine will continue to operate normally, which is marked NORM on the output of evaluation block 606.

It was thus recognized that the use of a merely constant threshold value can have several serious disadvantages, and a proposed solution is presented which represents an improvement on the prior art. It is known that ice impairs the aerodynamic properties of the rotor blade profile. Typically, the lift coefficient and stall angle, i.e., the angle of attack at which flow separation occurs on the blade profile around which there is flow, are reduced. Furthermore, the drag coefficient increases, such that the lift-to-drag ratio also deteriorates significantly due to the reduced lift. It was recognized in this case that all of these influences on the aerodynamic properties of the rotor blade profile can result in a wind turbine reacting very differently to ice formation in the operating range over the wind speeds that are encountered, and that this wind-speed-dependent behavior can also vary greatly from one wind turbine type to another.

One of the reasons for this is that the properties of the rotor blade profiles used can vary from one wind turbine type to another, and the design philosophies chosen for rotor blade design can differ greatly due to different wind class requirements, which was also recognized. It is therefore proposed to depart from the constant threshold value for the detection of the accretion of ice in the power-curve method of the prior art, and to further develop the threshold value towards a wind-speed-dependent threshold value. Such a proposed wind-speed-dependent threshold value in this case is wind-turbine or rotor-blade specific, such that it is proposed to define the function of the threshold value separately for each turbine type. This is regarded as a significant further development compared to the prior art, which has only one universal threshold value.

The invention claimed is:

1. A method for identifying an accretion of ice on a rotor blade of a rotor of a wind turbine, comprising:
   recording a wind speed of wind acting on the rotor, the rotor being operable at a variable rotational speed;
   recording an operating variable that is dependent on the wind speed, wherein recording the operating variable includes:
      recording an output power generated by the wind turbine from the wind as the operating variable for wind speeds below a rated wind speed, and
      recording a blade angle set to limit the output power as the operating variable for wind speeds above the rated wind speed;
   comparing the recorded operating variable or the recorded wind speed with a reference variable of a characteristic operating curve of the wind turbine, wherein the characteristic operating curve indicates the operating variable based on the wind speed; and
   identifying the accretion of ice on the rotor blade in response to the recorded operating variable or the recorded wind speed deviating from the reference variable by at least a minimum deviation, wherein the minimum deviation is specified based on the wind speed, wherein a minimum power deviation, a minimum angle deviation or a minimum speed deviation is specified in dependence on the wind speed; and
   in response to identifying the accretion of ice on the rotor blade, operating the wind turbine in a curtailed mode or starting a heating process of the wind turbine.

2. The method as claimed in claim 1, wherein:
   the recorded operating variable is a recorded output power generated by the wind turbine from the wind, a recorded rotor rotational speed of the wind turbine, and/or a recorded blade angle set to limit the output power,
   comparing the recorded operating variable or the recorded wind speed with the reference variable includes:
      comparing the recorded output power with a reference power of a characteristic operating power curve of the wind turbine, or comparing the recorded wind speed with a wind speed assigned to the recorded output power via the characteristic operating power curve, the characteristic operating power curve indicating a maximum output power based on the wind speed,
      comparing the recorded rotor rotational speed with a reference rotational speed of a characteristic rotational speed curve of the wind turbine, or comparing the recorded wind speed with a wind speed assigned to the recorded rotor rotational speed via the characteristic rotational speed curve, the characteristic rotational speed curve indicating a maximum rotor rotational speed based on the wind speed, and/or
      comparing the recorded blade angle with a reference angle of a characteristic blade angle curve of the wind turbine, or comparing the recorded wind speed with a wind speed assigned to the recorded blade angle via the characteristic blade angle curve, the characteristic blade angle curve indicating an optimal blade angle based on the wind speed, and
   identifying the accretion of ice on the rotor blade in response to the recorded operating variable or the recorded wind speed deviating from the reference variable by at least the minimum deviation includes identifying the accretion of ice on the rotor blade in response to:
      the recorded output power deviating from the reference power by at least the minimum power deviation, or the recorded wind speed deviating from the wind speed assigned to the recorded output power by the minimum speed deviation,
      the recorded rotor rotational speed deviating from the reference rotational speed by at least a minimum rotational speed deviation or the recorded wind speed deviating from the wind speed assigned to the recorded rotor rotational speed by the minimum speed deviation, the minimum rotational speed deviation being specified based on the wind speed, and/or
      the recorded blade angle deviating from the reference angle by at least the minimum angle deviation or the recorded blade angle deviating from the wind speed assigned to the recorded blade angle deviates by the minimum speed deviation.

3. The method as claimed in claim 2, wherein
   the characteristic blade angle curve is specified depending on a reduced operating limit that is a reduced power limit and/or a reduced rotational speed limit, and
   the minimum angle deviation is specified based on the reduced operating limit.

4. The method as claimed in claim 1, wherein
   the minimum deviation is specified using a deviation curve, and the deviation curve indicates a behavior of the operating variable based on the wind speed, and wherein:
      the deviation curve deviates from the characteristic operating curve by the minimum deviation, and a varying distance is obtained between the characteristic operating curve and the deviation curve, the deviation curve is not shifted by a constant wind speed value relative to the characteristic operating curve, and/or
the deviation curve deviates from the characteristic operating curve by wind speed values of differing magnitude.

5. The method as claimed in claim 1, wherein:
in partial-load operation, the minimum power deviation increases at least one of: from a first start-up wind speed, from a wind speed threshold or continuously, and
in full-load operation, the minimum angle deviation decreases with increasing wind speed.

6. The method as claimed in claim 1, wherein the wind turbine is operated using a rotational speed power characteristic having the output power of the wind turbine set based on a recorded rotational speed of the rotor.

7. The method as claimed in claim 1, wherein the accretion of ice on the rotor blade is detected only in response to a recorded outside temperature being below a maximum temperature.

8. The method as claimed in claim 1, comprising:
setting the characteristic operating curve during operation of the wind turbine, and/or
setting the characteristic operating curve during operation of the wind turbine includes recording operating deviations representative of deviations of the recorded operating variable from an operating variable according to the characteristic operating curve and that are not due to the accretion of ice, and wherein:
the minimum deviation is selected such that it is greater in magnitude than a corresponding operating deviation.

9. The method as claimed in claim 1, comprising:
determining multiple times in a predefined test period whether the recorded operating variable or the recorded wind speed deviates from the reference variable by at least the minimum deviation; and
identifying the accretion of ice in response to a positive determination for a majority of the multiple times.

10. The method as claimed in claim 1, comprising:
setting three wind speed sections for a lower wind-speed range, setting the three wind speed sections including:
setting the three wind speed sections to be equally sized;
setting a first wind speed section that extends from a start-up wind speed at which the wind turbine starts up to a first section wind speed;
setting a second wind speed section that extends from the first section wind speed to a second section wind speed; and
setting a third wind speed section that extends from the second section wind speed to the rated wind speed, wherein
the minimum deviation in each of the three wind speed sections increases with increasing wind speed, and at least one of:
the minimum deviation increases continuously from the first wind speed section to the third wind speed section with increasing wind speed,
a mean minimum deviation of the third wind speed section is at least 50% greater than a mean minimum deviation of the second wind speed section, and/or the mean minimum deviation of the second wind speed section is at least 50% greater than a mean minimum deviation of the first wind speed section.

11. The method as claimed in claim 1, wherein:
recording the operating variable includes recording the generated output power and the blade angle; and
identifying the accretion of ice on the rotor blade in response to the recorded operating variable or the recorded wind speed deviating from the reference variable by at least the minimum deviation includes identifying the accretion of ice on the rotor blade in response to:
the recorded output power deviating from a reference power by at least the minimum power deviation,
the recorded blade angle deviating from a reference angle by at least the minimum angle deviation, and/or
the recorded wind speed deviating from a wind speed assigned to the recorded output power or from a wind speed assigned to the recorded blade angle by the minimum speed deviation.

12. The method as claimed in claim 5, wherein the minimum angle deviation or the minimum speed deviation increases in response to the wind turbine working in a reduced mode in which the output power is reduced to a power value that is at most 50% of a rated power of the wind turbine.

13. The method as claimed in claim 7, wherein the accretion of ice on the rotor blade is detected only in response to the recorded outside temperature being below the maximum temperature and above a minimum temperature that is set depending on the wind speed.

14. The method as claimed in claim 8, comprising:
selecting or changing a deviation curve such that the characteristic operating curve having the operating deviations is not below the deviation curve.

15. The method as claimed in claim 1, wherein the characteristic operating curve indicates the operating variable assumed to be optimal based on the wind speed.

16. The method as claimed in claim 14, comprising:
recording the operating deviations as standard deviations;
combining the operating deviations as a deviation band, and selecting or changing the deviation curve to be below the deviation band relative to the operating variable; and/or
setting a respective minimum deviation or the deviation curve during operation of the wind turbine based on the characteristic operating curve and/or the recorded operating deviations.

17. The method as claimed in claim 16, wherein the respective minimum deviation or the deviation curve is set depending on an ambient temperature of the wind turbine.

18. The method as claimed in claim 16, comprising:
setting the respective minimum deviation or the deviation curve depending on the wind speed and at least one property of the wind acting on the rotor; and
at least one of:
selecting the at least one property of the wind from a list of properties including:
a turbulence intensity of the wind,
a vertical shear of the wind,
a horizontal shear of the wind,
a wind direction, and
a change in wind direction over height; and/or
determining the minimum deviation depending on a classification of the wind, the classification of the wind depending on at least one wind field parameter formed by the at least one property of the wind.

19. The method as claimed in claim 16, wherein the respective minimum deviation or the deviation curve depends on a blade profile of the rotor blade.

20. A wind turbine, comprising:
   at least one rotor operable at a variable rotational speed and having at least one rotor blade;
   a wind speed measuring device configured to record a wind speed of wind acting on the rotor; and
   a controller configured to:
      record an operating variable that is dependent on the wind speed, wherein recording the operating variable includes:
         recording an output power generated by the wind turbine from the wind as the operating variable for wind speeds below a rated wind speed, and
         recording a blade angle set to limit the output power as the operating variable for wind speeds above the rated wind speed;
      compare the recorded operating variable or the recorded wind speed with a reference variable of a characteristic operating curve of the wind turbine, wherein the characteristic operating curve indicates the operating variable based on the wind speed; and
      detect an accretion of ice on the rotor blade in response to the recorded operating variable or the recorded wind speed deviating from the reference variable by at least a minimum deviation, the minimum deviation being set depending on the wind speed, wherein a minimum power deviation, a minimum angle deviation or a minimum speed deviation is specified in dependence on the wind speed; and
      in response to identifying the accretion of ice on the rotor blade, operate the wind turbine in a curtailed mode or starting a heating process of the wind turbine.

\* \* \* \* \*